Patented Feb. 1, 1949

2,460,710

UNITED STATES PATENT OFFICE 2,460,710

FUNGICIDAL PREPARATIONS

Kenneth G. Nolan, South Norwalk, Russell L. Morgan, Old Greenwich, and John H. Fletcher, Riverside, Conn., assignors to American Cyanamid Company, New York, N. Y., a corporation of Maine No Drawing. Application January 31, 1947, Serial No. 725,742

6 Claims. (Cl. 99—154)

The present invention relates to improvements in fungicidal preparations, and more particularly to methods of controlling the decay of citrus fruits.

Many attempts have been made to develop a treatment which would decrease the spoilage of citrus fruit. Stem-end rot organisms usually infect the "button" of the fruit sometime before picking but remain inactive until after harvest, while others which produce the blue and green molds infect abrasions on the fruit after harvest. Borax has been commonly employed in the past as a dip treatment for the control of storage rots although it is not too effective in controlling stem-end decay.

It has now been discovered that 2-aminopyridine and its salts are effective agents for the control of organisms which cause decay of citrus fruits.

The 2-aminopyridine salts which have been found particularly effective in controlling citrus fruit decay include the formate, acetate, sulfate, hydrochloride, phosphate and borate salts.

2-aminopyridine is a white, crystalline solid melting at 56° C. The free base and also its salts are highly water soluble and can be used by dissolving them in the water employed in washing the citrus fruit.

These fungicidal agents are compatible with aqueous wax emulsions commonly employed for coating fresh citrus fruit. U. S. Patent 2,261,229 describes a number of such wax emulsions. They can be used in combination with these emulsions to obtain control of storage decay fungi, reduction of water loss, and improved appearance of the citrus fruit.

The fungi Diplodia natalensis and Phomopsis citri causing stem-end rot, the fungi Penicillium italicum causing blue mold, and the fungi Penicillium digitatum causing green mold of oranges are readily controlled by 2-aminopyridine and its salts.

The compounds of this invention may be employed either in water solutions or in aqueous wax emulsions in concentrations ranging from 0.5 to 10.0%.

While the invention has been described with particular reference to specific embodiments, it is to be understood that it is not to be limited thereto but is to be construed broadly and restricted solely by the scope of the appended claims.

We claim:

1. A method of controlling organisms which cause decay of citrus fruits which includes applying to said fruit a toxic quantity of a water soluble compound selected from the group consisting of 2-aminopyridine and its salts of acids.

2. A method of controlling organisms which cause decay of citrus fruits which includes applying to said fruit a toxic quantity of a water soluble compound selected from the group consisting of 2-aminopyridine and its salts of acids in an aqueous wax emulsion.

3. A fungicidal composition for the control of organisms which cause decay of citrus fruits containing a toxic amount of a water soluble compound selected from the group consisting of 2-aminopyridine and its salts of acids in an aqueous wax emulsion.

4. A fungicidal composition for the control of organisms which cause decay of citrus fruits containing a water soluble compound selected from the group consisting of 2-aminopyridine and its salts of acids in an aqueous wax emulsion, in a concentration within the range of 0.5 to 10.0%.

5. A method of controlling organisms which cause decay of citrus fruits which includes applying to said fruits a quantity of 2-aminopyridine toxic to said decay organisms.

6. A fungicidal composition for the control of organisms which cause decay of citrus fruits containing 2-aminopyridine in an aqueous wax emulsion, in a concentration within the range of 0.5 to 10.0%.

KENNETH G. NOLAN.
RUSSELL L. MORGAN.
JOHN H. FLETCHER.

REFERENCES CITED

The following references are of record in the file of this patent:

UNITED STATES PATENTS

| Number    | Name            | Date           |
|-----------|-----------------|----------------|
| 1,809,016 | Brogden         | June 9, 1931   |
| 1,943,468 | Bridgeman et al.| Jan. 16, 1934  |
| 2,080,517 | Tisza           | May 18, 1936   |
| 2,129,294 | Wibaut et al.   | Sept. 6, 1938  |
| 2,136,044 | Engelmann       | Nov. 8, 1938   |
| 2,170,209 | Magegeli        | Aug. 22, 1939  |
| 2,372,588 | Larsen          | Mar. 27, 1945  |